United States Patent

[11] 3,569,993

| [72] | Inventors | Jean Blin;<br>Maurits W. Geerlings, Karlsruhe; Herman A. Tasman, Karlsruhe-Waldstadt, Germany |
|---|---|---|
| [21] | Appl. No. | 735,636 |
| [22] | Filed | June 10, 1968 |
| [45] | Patented | Mar. 9, 1971 |
| [73] | Assignee | European Atomic Energy Community Brussels, Belgium |
| [32] | Priority | June 26, 1967 |
| [33] | | Germany |
| [31] | | E34240 |

[54] APPARATUS FOR IRRADIATING A SPECIMEN WITH A LASER BEAM
3 Claims, 3 Drawing Figs.

[52] U.S. Cl. ..................................................... 219/121
[51] Int. Cl. ...................................................... B23K 9/24
[50] Field of Search........................................... 219/121, 121 (L); 321/69 (D) 69; 346/108

[56] References Cited
UNITED STATES PATENTS
3,154,371  10/1964  Johnson .................... 346/108

| 3,369,101 | 2/1968 | DiCurcio............... | 219/121 (L) |
| 3,387,109 | 6/1964 | Bruma.................... | 219/121 (L) |
| 3,388,314 | 6/1968 | Gould..................... | 219/121 (L) |

FOREIGN PATENTS
454,302   4/1968   Switzerland..............   121 (L)/

OTHER REFERENCES
" Electronics" of July 5, 1963; A McGraw-Hill weekly publication; 219/121 (Laser).

Primary Examiner—J. V. Truhe
Assistant Examiner—R. Skudy
Attorney—Stevens, Davis, Miller and Masher ABSTRACT: An apparatus for irradiating a specimen with a laser beam in a hot cell comprising a laser generator located outside the cell and an observation channel for remote adjustment of the specimen. The laser beam and the observation channel are in a common duct with their axes parallel to each other. A movable mirror system in the observation channel near the specimen is used to bring the two axes into coincidence when an observation is to be made.

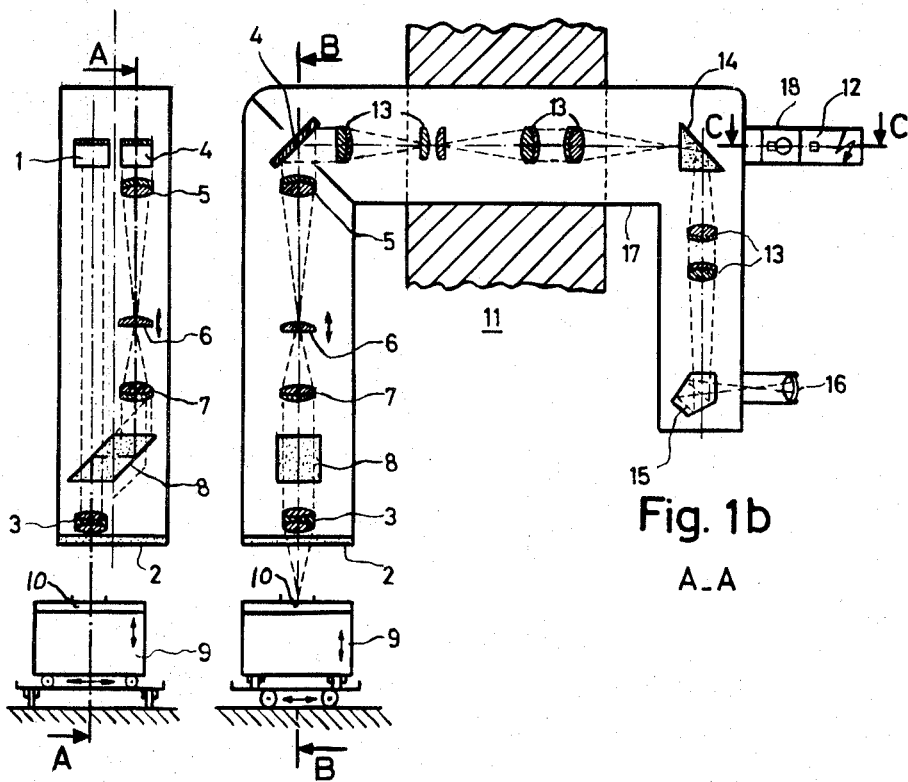
Fig. 1a
Fig. 1b
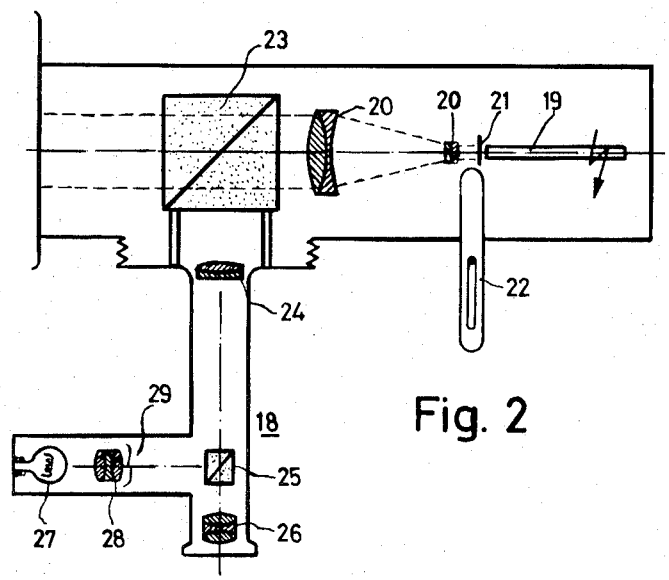
Fig. 2

APPARATUS FOR IRRADIATING A SPECIMEN WITH A LASER BEAM

The invention relates to apparatus for irradiating a specimen with a laser beam which is generated in a laser emitter separated from the specimen by a shielding wall and is passed through this wall by means of an afocal optical system mounted in a bent or nonrectilinear duct or tube.

The problem of so irradiating a specimen from a distance arises particularly often in nuclear physics, where the specimens to be irradiated may be treated in "hot cells" behind thick shielding walls. Preferably, instruments which are liable to break down or which require much maintenance should be located outside the cells, to which access is difficult. Also, it is desirable for the positioning of the laser beam and the effect of irradiation to be discerned optically as well as is possible.

Since these requirements are not fulfilled by a laser emitter situated in the "hot cell" and monitored by television sets, apparatus of the type described is proposed in which, according to the invention, a second optical system is mounted substantially parallel to the axis of the laser beam in the same duct and leads from an eyepiece on the side of the wall near the laser emitter to a movable mirror system at the other side of the wall near the end of the duct. This system in one position reflects the optical axis of the second system into that of the first system, so that the image point of the second optical system coincides with the image point or axis of the laser beam.

Preferably, the laser emitter is in alignment with the aperture provided in the wall for the duct and the eyepiece is situated out of alignment with the wall aperture, by way of at least one further diversion of the axis of the second optical system associated with it. The laser emitter may be horizontal.

The basic idea of the invention, therefore, is to use a kind of stereoperiscope, of which one system serves for monocular optical observation and the other system guides the laser beam. Once the two systems are correctly positioned relative to each other, the axis of the laser beam can be directed on to a desired place on the specimen under optical control. Also, immediately after radiation, the effect of radiation can be ascertained optically.

The invention will now be described in more detail with reference to a specific embodiment illustrated in FIGS. 1a, 1b and 2.

FIGS. 1a and 1b show orthogonal sections through apparatus embodying the invention, reduced to essentials; and FIG. 2 shows another section through part of the apparatus, on a larger scale.

FIG. 1a illustrates a section through the portion of the apparatus projecting into the "hot cell", looking towards the shielding wall. On the left-hand side there is the afocal system for the laser beam, containing a reflecting mirror 1 at the top and converging lens 3 immediately above a closeable window 2 at the bottom.

On the right-hand side, parallel to this system, there is the second (optical) system, containing (starting at the top) a reflecting mirror 4, a converging lens 5, an adjustable field lens 6 with crosshairs, another converging lens 7 and a reflecting prism 8. In the position shown this prism shifts the axis of the optical system into that of the laser system, so that a bearing can be taken optically on the site of irradiation (a specimen 10 movable in three orthogonal directions on a specimen carrier 9). The prism can be pivoted into the position shown by broken lines, so that is it is out of range of the laser beam during irradiation.

FIG. 1b, which shows a section on the line A-A in FIG. 1a, follows the path of the two systems back through the shielding wall 11 to the side nearer the observer and operator and the laser emitter. The section A-A passes through the axis of the optical system. The afocal laser system is therefore not visible; it does not contain any lenses besides the lens, later mentioned, immediately in front of the laser generator 12.

The optical system, by contrast, contains a plurality of lenses 13, a reflecting prism 14 in the top right-hand corner and a reflecting prism 15 in front of an eyepiece 16. The system is analogous to a periscope and since the periscope art is highly developed, the system will not be described in detail.

The eyepiece 16 is not aligned with the aperture in the wall, whereas the laser generator 12 is aligned with it. The operator is therefore protected against both the laser beam and any radioactivity which might penetrate through the aperture. The magnification factor of the optical system may be altered by changing the two lenses 13, between the reflecting prisms 14 and 15. The two systems are housed in a common U-shaped duct or tube 17, which may be evacuated if necessary. When the apparatus is first set up, or when repairs have been made to the laser, the laser beam must be centered on the point of the specimen 10 which is visible centrally in the eyepiece 16. To this end an observation instrument 18 is provided, which can be pivoted into the path of the rays when necessary, and which can be inserted between the laser generator 12 and the tube 17 by means of a resilient bellows. This observation instrument is shown on a larger scale in FIG. 2, which represents a section along a line C-C in FIG. 1b. It also shows the laser rod 19 and the (afocal) laser lens 20 mentioned above. The laser rod may for example be of neodymium. A semitransparent mirror 21 immediately in front of the laser rod is used for adjusting by means of the observation instrument 18. Next to it there is a safety slide 22, which covers the rod during adjusting and protects the observer from any laser pulses. (This risk can be greatly reduced in any case by means of additional electrical interlock circuits, which will not be described here).

The observation instrument consists of a Lummer Cube 23, a lens 24, a double prism 25 and an eyepiece 26, with crosshairs all aligned with one another. A light source 27, a condenser 28 and an aperture 29 are arranged in such a way relative to the double prism that they direct a spot of light on to the lens 24. The whole of the observation instrument forms one structural unit which can be pivoted about an axis situated in the plane of FIG. 2, so that the Lummer Cube 23 is in the path of the rays from the laser when in the position shown and is outside this path when in another limit position.

In order to adjust the laser rod 19, the observation instrument is first brought into the position shown, and the spot of light is projected into infinity by the lens 24. The image of the spot of light is reflected in the Lummer Cube, passes through the laser lens 20, is reflected in the mirror 21 and reaches crosshairs in the eyepiece 26. The observation instrument is moved by means of setscrews (not shown) until the spot falls on to the center of the eyepiece.

A bearing is now taken on a central point on the specimen carrier 9 by means of the optical system of the irradiation apparatus (prism 8 being in the position shown), and the same point is sought in the eyepiece 26 (the prism now being in the position shown with broken lines). By means of further setscrews (not shown), the unit comprising the laser emitter and the observation instrument is shifted until the point is central in the eyepiece 26. The path of the rays now passes through the whole of the laser duct, and does not enter the observation instrument until it has been reflected by the mirror 21 and Lummer Cube 23.

Now that the laser rod has been set for the image point—commmon to both systems—on the specimen carrier, the observation instrument is pivoted out of range of the laser beam and the safety slide 22 is retracted. (These two movements may be positively connected by means of a mechanical coupling). The apparatus is now available for irradiation.

A specimen for irradiation is now attached to the specimen carrier 9 and observed through the eyepiece 16 of the optical system, the prism 8 being swung downwards. By means of suitable (remote-controlled) movement of the specimen carrier, an irradiation point is selected and a fine adjustment is made. The prism 8 is now tilted up out of the position shown, and the laser emitter begins to operate. After irradiation, the effect of irradiation can be examined using the optical system again, the prism being pivoted downwards.

The irradiation apparatus embodying the invention therefore completely fulfills the requirements mentioned at the beginning of this specification and is particularly suitable for use in nuclear physics.

We claim:

1. Apparatus for observing and irradiating a specimen with a laser beam in a hot cell comprising a shielding wall, a non-rectilinear duct passing therethrough, emitter means outside said wall for generating a laser beam, an afocal optical system for said laser beam mounted in said duct, a second optical system mounted with its axis substantially parallel to the axis of said afocal system with an eyepiece outside said wall, a movable mirror system inside said wall near said specimen which mirror in one position reflects the axis of said second optical system into the axis of the afocal system so that the image points of both systems coincide.

2. Apparatus as claimed in claim 1, in which the laser emitter is in alignment with the aperture provided in the wall for the duct, and the eyepiece is situated out of alignment with the wall aperture, by way of at least one further diversion of the axis of the second optical system associated with it.

3. Apparatus as claimed in claim 2, in which an observation instrument is movable into the path of the laser beam between the laser emitter and the wall, and the coincidence of the two systems can be verified by means of this instrument.